United States Patent
Santo et al.

[11] Patent Number: 6,022,034
[45] Date of Patent: Feb. 8, 2000

[54] TWIST BEAM SUSPENSION

[75] Inventors: Toshiyasu Santo, Aichi; Takeshi Noguchi, Yokohama; Michio Kasahara, Inuyama, all of Japan

[73] Assignees: Toyota Jidosha Kabushiki Kaisha, Toyota; Bridgestone Corporation, Tokyo; Tokai Rubber Industries, Ltd., Komaki, all of Japan

[21] Appl. No.: 09/265,881

[22] Filed: Mar. 11, 1999

Related U.S. Application Data

[62] Division of application No. 08/727,926, Oct. 9, 1996.

[51] Int. Cl.⁷ .................................................. B60G 21/00
[52] U.S. Cl. ............................ 280/124.106; 280/124.166; 280/124.128
[58] Field of Search ..................... 280/124.106, 124.107, 280/124.128, 124.13, 124.166, FOR 180

[56] References Cited

U.S. PATENT DOCUMENTS

| | | | |
|---|---|---|---|
| 3,154,323 | 10/1964 | Hooven | 280/124.128 |
| 4,084,838 | 4/1978 | Vor der Bruck et al. | 280/124.106 |
| 4,458,918 | 7/1984 | Rumpel | 280/124.13 |
| 4,650,209 | 3/1987 | Sumimoto | 280/124.13 |
| 4,930,805 | 6/1990 | Takata et al. | 280/124.13 |
| 4,943,082 | 7/1990 | Kijima et al. | 280/124.13 |
| 5,083,812 | 1/1992 | Wallace et al. | 280/124.106 |
| 5,439,243 | 8/1995 | Kato et al. | 280/124.106 |
| 5,692,767 | 12/1997 | Kato | 280/124.142 |

FOREIGN PATENT DOCUMENTS

| | | |
|---|---|---|
| 2-434-965 | 3/1980 | France . |
| 2-520-072 | 7/1983 | France . |
| 2520072 | 7/1983 | France . |
| 56-39640 U | 4/1981 | Japan . |
| 57-190938 U | 12/1982 | Japan . |
| 58-20505 | 2/1983 | Japan . |
| 60-164147 U | 10/1985 | Japan . |
| 61-98607 U | 6/1986 | Japan . |
| Y-2-61-38806 | 11/1986 | Japan . |
| 61-271106 | 12/1986 | Japan . |
| 62-210112 | 9/1987 | Japan . |
| 4-283114 | 10/1992 | Japan . |
| 7-190132 | 7/1995 | Japan . |

*Primary Examiner*—Paul N. Dickson
*Assistant Examiner*—Lynda Jasmin
*Attorney, Agent, or Firm*—Oliff & Berridge, PLC

[57] ABSTRACT

A twist beam suspension includes a twist beam which is disposed so that the longitudinal direction thereof runs along with the transverse direction of a vehicle, and a pair of trailing arms being connected to a body of the vehicle and each of which is disposed at a respectively different longitudinal end of the twist beam and is disposed such that the longitudinal direction thereof runs along the longitudinal direction of the vehicle. The twist beam suspension further includes a restricting apparatus which restricts inward displacement of the pair of trailing arms relative to the body of the vehicle in the transverse direction of the vehicle prior to restricting outward displacement of the pair of trailing arms relative to the body of the vehicle in the transverse direction of the vehicle.

4 Claims, 8 Drawing Sheets

F I G. 3
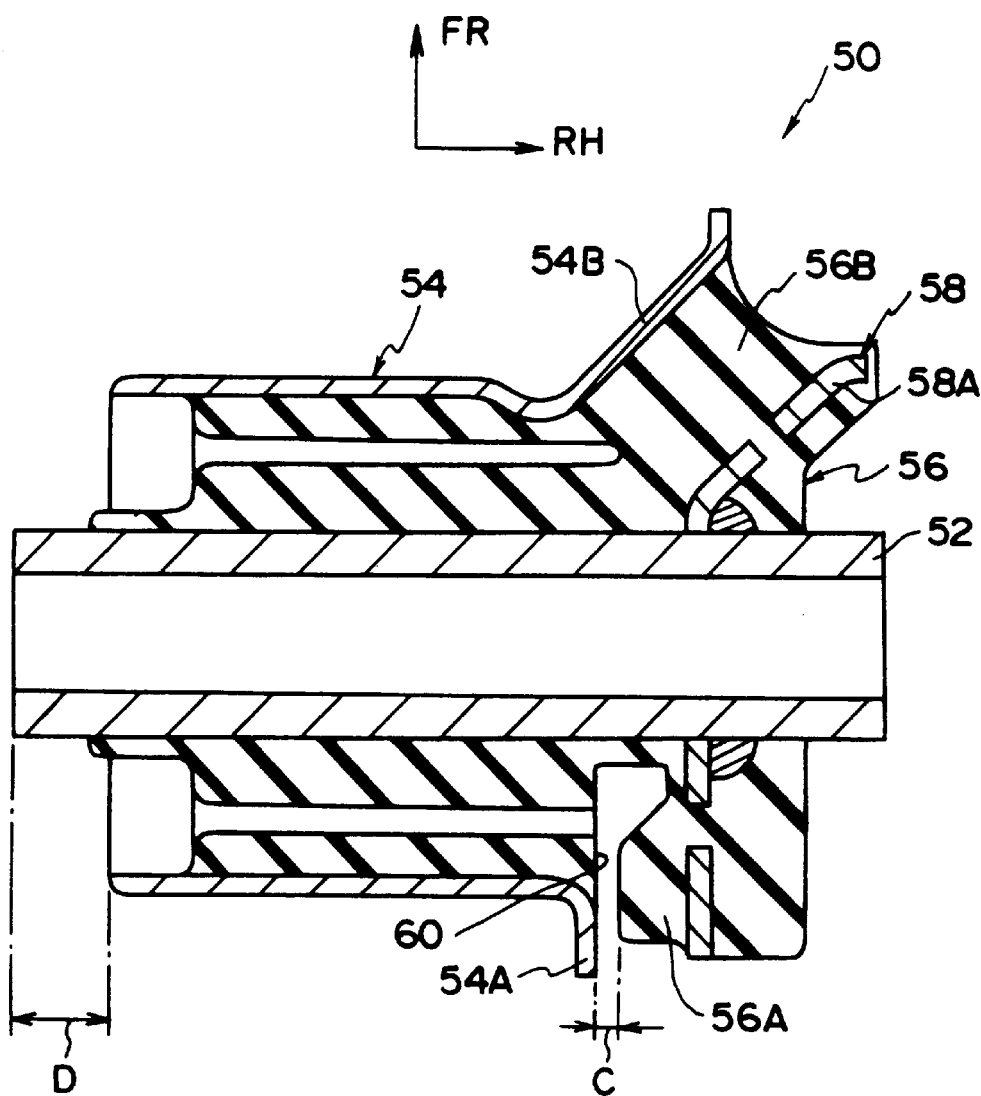

TWIST BEAM SUSPENSION

This a Division of application Ser. No. 08/727,926 filed Oct. 9, 1996. The entire disclosure of the prior application is hereby incorporated by reference herein in its entirety.

BACKGROUND OF THE INVENTION

1. Field of the Invention

The present invention relates to a twist beam suspension consisting of a twist beam which is disposed so as to extend in the transverse direction of a vehicle, and a pair of trailing arms which are disposed at longitudinal ends of the twist beam so as to extend in the longitudinal direction of the vehicle.

2. Description of the Related Art

FIG. 7 shows a plan view of a twist beam rear suspension. An example of such a twist beam rear suspension is disclosed in Japanese Patent Application Laid-Open (JP-A) No. 4-283114.

As shown in FIG. 7, such a twist beam rear suspension consists of a twist beam 100 which has an open (i.e., substantially C-shaped) cross-sectional configuration and which is disposed so as to extend in the transverse direction of a vehicle, and a pair of trailing arms 102 and 104 disposed at longitudinal ends of the twist beam 100 so as to extend in the longitudinal direction of the vehicle.

From the rear ends of these trailing arms 102 and 104 are projected spindles 106 and 108, by which unillustrated right and left wheels are rotatably supported. Further, bushes 110, 112, whose axial directions run along the transverse direction of the vehicle, are press-fit to the vehicle longitudinal direction front end portions of the trailing arms 102, 104, respectively.

FIG. 8 shows an enlarged view of the bush 110 located on the right side in FIG. 7. As shown in FIG. 8, the bush 110 is composed of a cylindrical inner tube 114, a cylindrical outer tube 116 disposed so as to be apart from the out peripheral portion of the inner tube 114, and a rubber member 118 adhered by vulcanization between the inner tube 114 and the outer tube 116. On the inner side of the inner tube 114 in the transverse direction of the vehicle, an inner-side bracket 120 is mounted to a vehicle body such that the bracket 120 abuts the inner end of the inner tube 114. Similarly, on the outer side of the inner tube 114 in the transverse direction of the vehicle, an outer-side bracket 122 is mounted to the vehicle body such that the bracket 122 abuts the outer end of the inner tube 114. In this state, a bolt 124 is inserted into the inner tube 114 after passing through the outer-side bracket 122, and a nut 126 is screwed onto the bolt 124, whereby the trailing arm 102 is swingably connected to the vehicle body. The bush 112 on the left side in FIG. 7 has the same structure.

In the above-described twist beam rear suspension, the distance A' between the inner end of the outer tube 116 and the outside surface of the inner-side bracket 120 is designed to be substantially equal to the distance B' between the outer end of the outer tube 116 and the inner side surface of the outer-side bracket 122. In some cases, the distance A' becomes larger than the distance B', because of the conditions of assembly and the like. Therefore, the conventional twist beam rear suspension has a drawback that the twist beam 100 receives a compression force when an excessive lateral force acts on one of the wheels.

That is, when an excessive lateral force F' acts leftward on the right wheel as shown in FIG. 7, the entire rear suspension tends to move leftward in FIG. 7 due to the lateral force F'. As described above, if the distance A' is stated larger than the distance B', the outer end of the outer tube 116 of the left-side bush 112 abuts the outer-side bracket 122 before the inner end of the outer tube 116 of the right-side bush 110 abuts the inner-side bracket 120. Therefore, the lateral force F' is transmitted to the vehicle body via the right-side trailing arm 102, the twist beam 100, the left-side trailing arm 104, the outer tube of the left-side bush 112 and the outer-side bracket 122 located on the left side of the twist beam 100. At this time, the twist beam 100 is subjected to the leftward lateral force F' and a reaction force which is transmitted from the outer-side bracket 122 located on the left side of the twist beams 100 to the outer tube of the left-side bush 112 (i.e., the left-side trailing arm 104). Accordingly, a compression force acts on the twist beam 100. This compression force as well as the open cross-sectional configuration of the twist beam 100 adversely affects the strength of the twist beam 100.

SUMMARY OF THE INVENTION

In view of the foregoing facts, it is an object of the present invention to provide a twist beam suspension which has a structure advantageous to the strength of a twist beam.

According to a first aspect of the present invention, there is provided a twist beam suspension which includes a twist beam which is disposed so that the longitudinal direction thereof runs along with the transverse direction of a vehicle, and a pair of trailing arms being connected to a body of the vehicle and each of which is disposed at a respectively different longitudinal end of the twist beam and is disposed such that the longitudinal direction thereof runs along the longitudinal direction of the vehicle. The twist beam suspension further includes restricting means which restricts inward displacement of the pair of trailing arms relative to the body of the vehicle in the transverse direction of the vehicle prior to restricting outward displacement of the pair of trailing arms relative to the body of the vehicle in the transverse direction of the vehicle.

According to a second aspect of the present invention, the twist beam suspension according to the first aspect further includes a connecting member for connecting a front end portion of each of the trailing arms in the longitudinal direction of the vehicle to the body of the vehicle. The connecting member has an inner tube and an outer tube, and the inner tube is provided at one of the trailing arm and the body of the vehicle and the outer tube is provided at the other. The restricting means is a stopper member which restricts relative displacement between the outer and inner tubes of the connecting member.

In the twist beam suspension according to the first aspect of the present invention, when an excessive lateral force acts on a wheel, the restricting means restricts inward displacement of the suspension relative to the body of the vehicle in the transverse direction of the vehicle prior to restricting outward displacement of the suspension relative to the body of the vehicle in the transverse direction of the vehicle. Therefore, the twist beam is not subjected to a compression force which would act on the twist beam when the above-described inward and outward displacements are restricted in the reverse order. Accordingly, the twist beam suspension has a structure advantageous to the strength of the twist beam.

In the second aspect of the present invention, the restricting means is composed of a stopper member which restricts relative displacement between the outer and inner tubes of the connecting member which connects the front end portion of each of the trailing arms to the body of the vehicle. Therefore, the structure of the restricting means can be simplified.

BRIEF DESCRIPTION OF THE DRAWINGS

FIG. 3 is a horizontal cross section of a bush according to a second aspect of the present invention, sectioned along a plane including the axis of the bush;

DESCRIPTION OF THE PREFERRED EMBODIMENTS

A first embodiment of the present invention will now be described with reference to FIGS. 1 and 2. In these drawings, arrow FR indicates the forward direction of a vehicle, arrow RH indicates the direction toward the right side of the vehicle, and arrow LH indicates the direction toward the left side of the vehicle.

Figure 2:
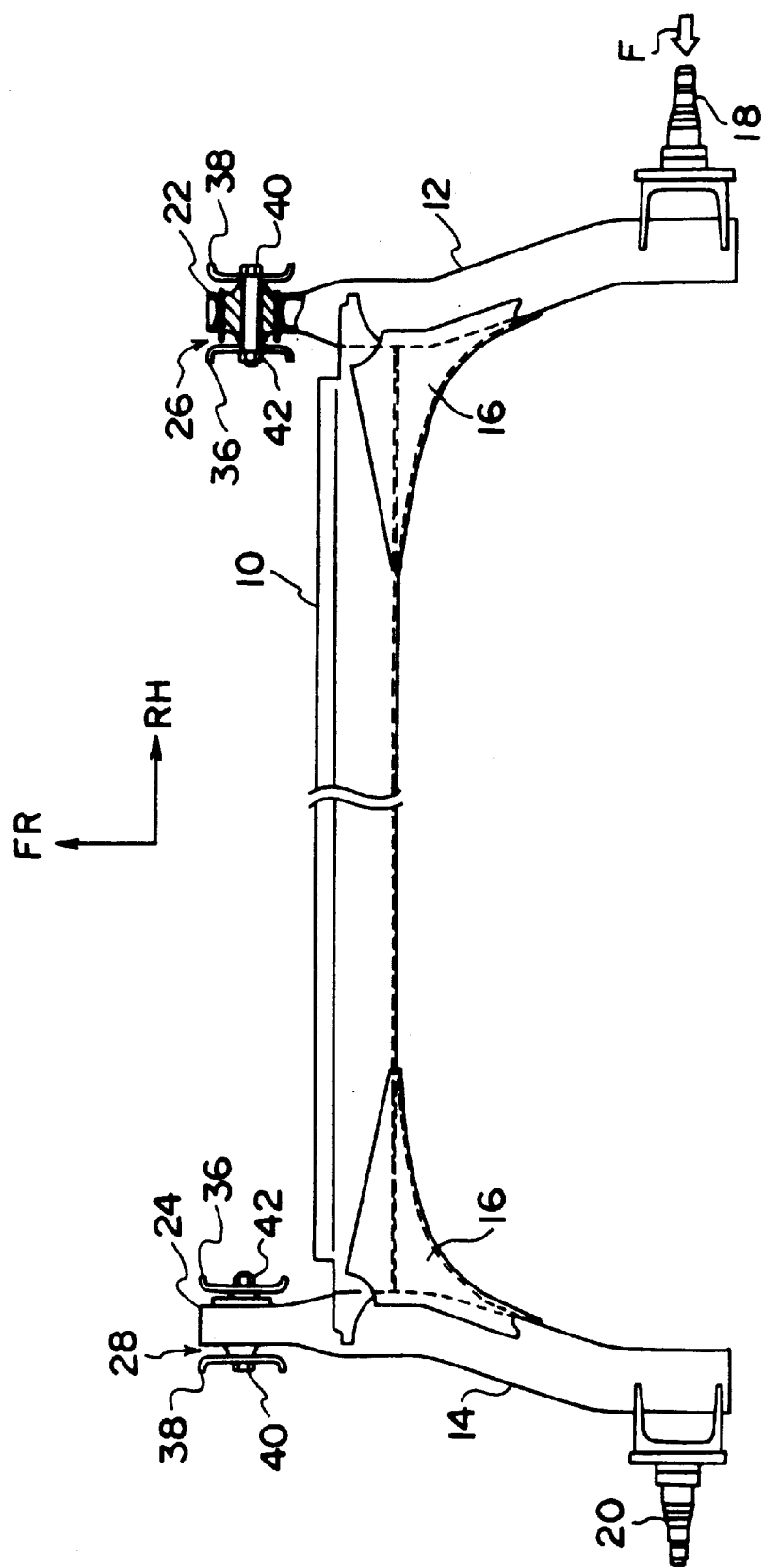
FIG. 2 is a plan view of the twist beam rear suspension according to the first aspect.

As shown in FIG. 2, a twist beam rear suspension according to the first embodiment consists of a twist beam 10 which is disposed so as to extend in the transverse direction of a vehicle, and a pair of trailing arms 12 and 14 which are disposed at opposite longitudinal ends of the twist beam 10 so as to extend in the longitudinal direction of the vehicle. The twist beams 10 has an open cross section of a generally U-like shape. Reinforcing gussets 16 are welded to the connecting portions at which the twist beam 10 and the trailing arms 12 and 14 are joined to each other.

From the rear ends of these trailing arms 12 and 14 are projected spindles 18 and 20, by which unillustrated right and left wheels are rotatably supported. Cylindrical bush press-fitting portions 22 and 24 are integrally formed at the front end portions of the trailing arms 12 and 14 in the longitudinal direction of the vehicle. Into the bush press-fitting portions 22 and 24 are press-inserted bushes 26 and 28 serving as connecting members such that their axes extend in the transverse direction of the vehicle.

Figure 1:
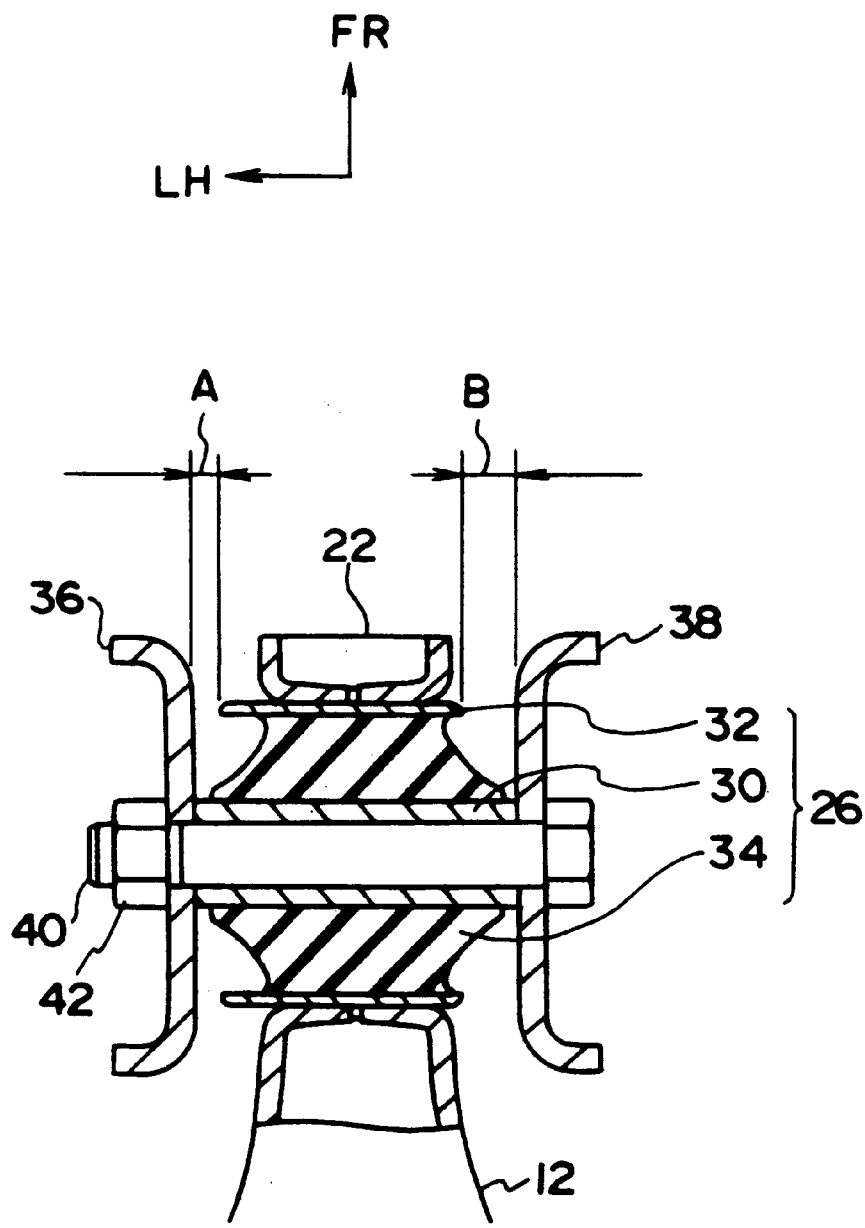
FIG. 1 is a horizontal cross section of a bush used in a twist beam rear suspension according to a first aspect of the present invention.
Figure 7:
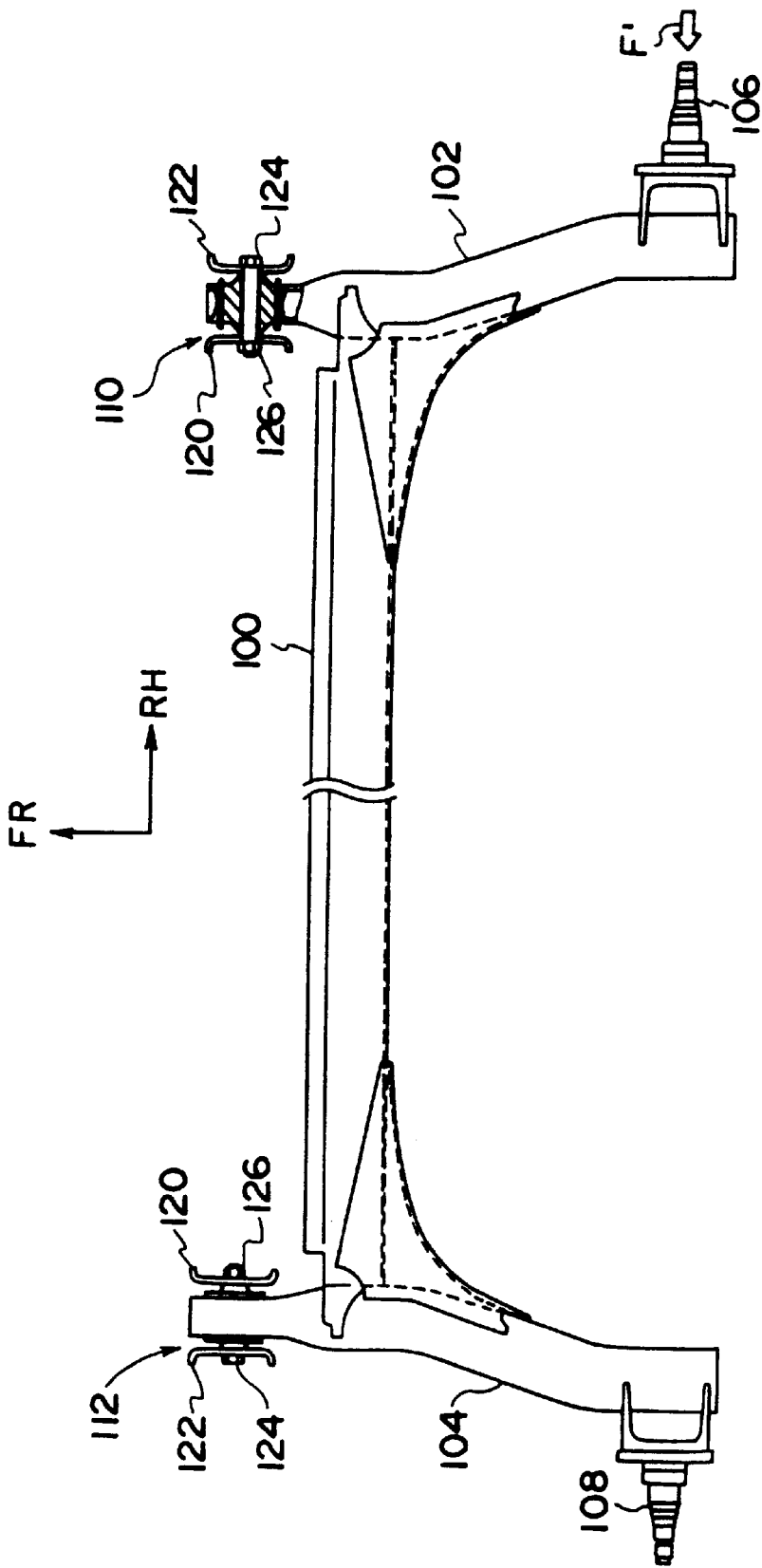
FIG. 7 is a plan view of a conventional twist beam rear suspension.
Figure 8:
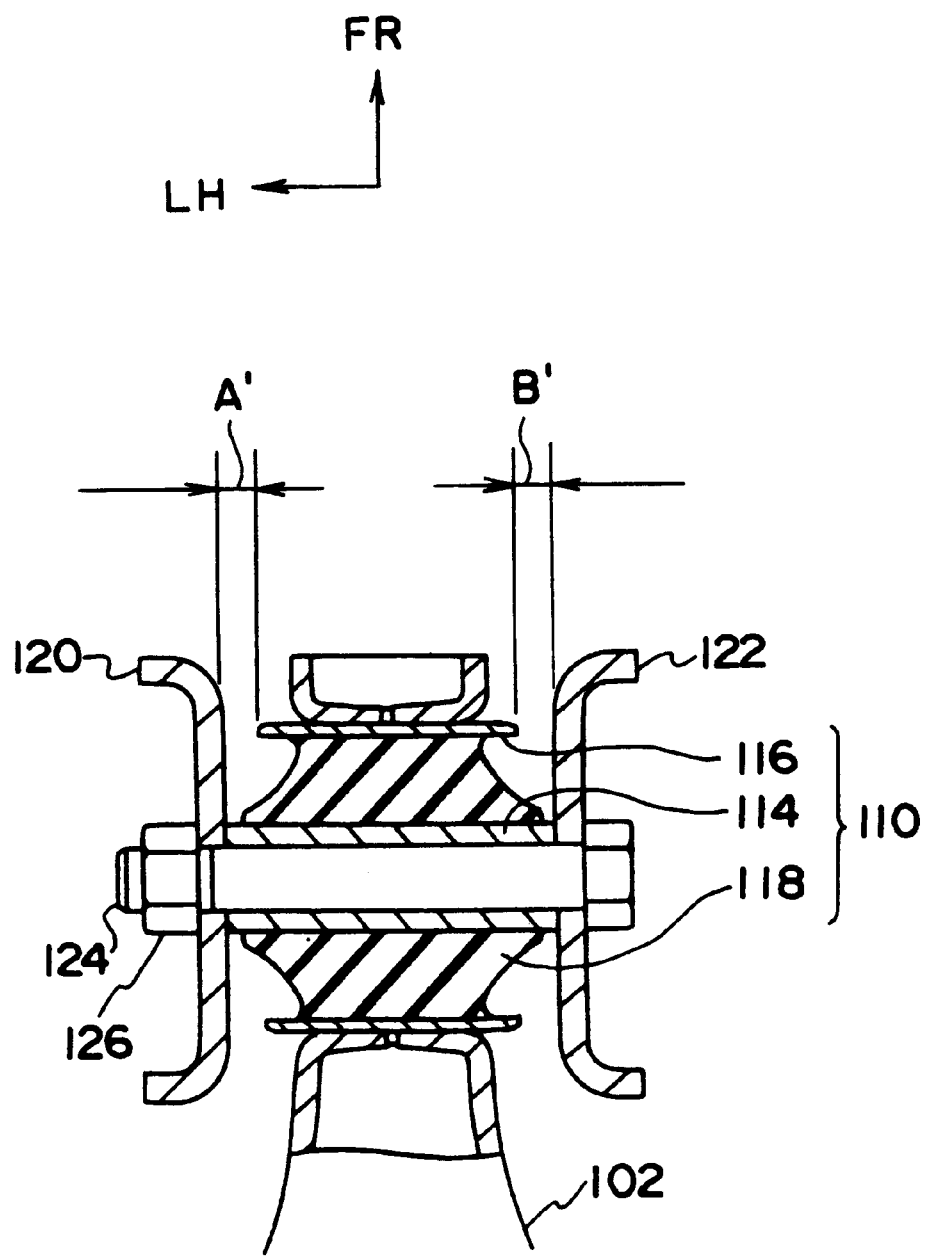
FIG. 8 is a horizontal cross section of a bush used in the twist beam rear suspension shown in FIG. 7.

FIG. 1 shows an enlarged view of the bush 26 located on the right side in FIG. 2. As shown in FIG. 1, the bush 26 is composed of a cylindrical inner tube 30, a cylindrical outer tube 32 which is disposed so as to surround the inner sleeve 30 with a spacing formed therebetween and which is press-inserted into the bush press-fitting portion 22, and a rubber member 34 which is disposed between the inner tube 30 and the outer tube 32 and joined thereto though vulcanization and which functions as an elastic member. On the inner side of the inner tube 30 in the transverse direction of the vehicle is disposed an inner-side bracket 36 which is mounted to the body of the vehicle and which serves as a restricting means. The inner-side bracket 36 abuts the inner end of the inner tube 30. Similarly, on the outer side of the inner tube 30 in the transverse direction of the vehicle is disposed an outer-side bracket 38 which is mounted to the body of the vehicle. The outer-side bracket 38 abuts the outer end of the inner tube 30. In this state, a bolt 40 is inserted into the inner tube 30 after passing through the outer-side bracket 38, and a nut 42 is screwed onto the bolt 40, whereby the trailing arm 12 located on the right side in FIG. 2 is swingably connected to the body of the vehicle. The bush 112 on the left side in FIG. 7 has the same structure.

The distance A between the inner end of the outer tube 32 of the bush 26 and the outwardly facing surface of the inner-side bracket 36 is designed to be smaller than the distance B between the outer end of the outer tube 32 and the inwardly facing surface of the outer-side bracket 38. This designed is also applied to the bush 28 located on the left side in FIG. 2.

Next, operation and effects of the present embodiment will be described.

When an excessive lateral force F acts leftward on the right wheel as shown in FIG. 2, the entire rear suspension tends to move leftward in FIG. 2 due to the lateral force F. In the present embodiment, as described above, the distance A between the inner end of the outer tube 32 of the bush 26 and the outwardly facing surface of the inner-side bracket 36 is smaller than the distance B between the outer end of the outer tube 32 and the inwardly facing surface of the outer-side bracket 38. Therefore, the inner end of the outer tube 32 of the right-side bush 26 abuts the inner-side bracket 36 before the outer end of the outer tube 32 of the left-side bush 28 abuts the outer-side bracket 38. Accordingly, the lateral force F is input from the right-side wheel to the right-side trailing arm 12, and then transmitted to the body of the vehicle via the outer tube 32 of the bush 26 and the inner-side bracket 36. That is, in the present embodiment, inward displacement of the suspension relative to the body in the transverse direction of the vehicle is restricted prior to outward displacement of the suspension relative to the body in the transverse direction of the vehicle. Therefore, the twist beam 10 is not subjected to compression force.

As described above, in the present embodiment, by setting the distance A between the inner end of the outer tube 32 of the bush 26 and the outwardly facing surface of the inner-side bracket 36 to be smaller than the distance B between the outer end of the outer tube 32 and the inwardly facing surface of the outer-side bracket 38, inward displacement of the suspension relative to the body in the transverse direction of the vehicle is restricted prior to outward displacement of the suspension relative to the body in the transverse direction of the vehicle. Therefore, a structure which is advantageous to the strength of the twist beam 10 can be obtained.

Moreover, in the present embodiment, inward displacement of the suspension relative to the body in the transverse direction of the vehicle is first restricted by causing the inner end of the outer tube 32 of the bush 26 to abut the inner-side bracket 36. This simplifies the structure of the rear suspension.

Next, a second embodiment of the present invention will be described with reference to FIGS. 3–6.

FIG. 3 shows a horizontal cross section of a bush 50 which is disposed on the left side of the above-described twist beam rear suspension and which serves as a connecting member.

As show in FIG. 3, the bush 50 is composed of coaxially disposed internal and outer tubes 52 and 54, and a rubber member 56 which is disposed between the sleeves 52 and 54 and joined thereto through vulcanization and which serves as an elastic member. The outer tube 54 is formed such that its axial length at a rear portion located on the rear side of the inner tube 52 in the longitudinal direction of the vehicle is shorter than the axial length at a front portion located on the front side of the inner tube 52 in the longitudinal direction of the vehicle, and that the inner end of the rear portion is bent toward the back of the vehicle. This bent portion will be refereed to as a "bent portion 54A" hereinafter. In the vicinity of the inner end of the inner tube 52 in the transverse direction of the vehicle, a plate 58 is welded to the outer circumferential surface of the inner tube 52 such that the plate 58 extends in the substantially radial direction of the inner tube 52. On the wall surface of the plate 58 located on the rear side of the inner tube 52 in the longitudinal direction of the vehicle, a projecting portion 56A is formed so as to project toward the bent portion 54A of the inner tube 52. This projecting portion 56A is integrally formed together with the rubber member 56 during a vulcanization/forming process. The rubber member 56, which is formed in a vicinity of the bent portion 54A, is flush with the end surface of the bent portion 54A, and that a spacing 60 is formed between the projecting portion 56A and the bent portion 54A. As the relationship between the distances A and B in the first embodiment, the size C of the spacing 60 is designed to be smaller than the distance D between the outer end of the outer tube 54 of the bush 50 and the external end of the inner tube 52 (which corresponds to the inwardly facing surface of the above-described outer-side bracket 38 although the outer-side bracket 38 is not illustrated in FIG. 3).

In the rear suspension of the present embodiment, the inner end portion and its neighboring portion of the outer tube 54 are bent so as to obliquely extend toward the front of the vehicle. This bent portion will be referred to as a "slant portion 54B of the outer tube 54" hereinafter. In order to cope with the inclination of the slant portion 54B, the front portion of the plate 58 in the longitudinal direction of the vehicle is bent so as to extend in substantially parallel with the slant portion 54B. This bent portion will be refereed to as a "slant portion 58A of the plate 58" hereinafter. The space between these slant portions 54B and 58A is filled with the rubber material 56. This portion of the rubber material will be referred to as an "expanded portion 56B" hereinafter.

In the twist beam rear suspension of the present embodiment having the above-described structure, as in the first embodiment, inward displacement of the suspension relative to the body in the transverse direction of the vehicle is restricted prior to outward displacement of the suspension relative to the body in the transverse direction of the vehicle. Therefore, the above-described structure of the twist beam rear suspension is advantageous to the strength of the twist beam 10. That is, when an excessive lateral force F acts rightward on the left wheel, the entire rear suspension tends to move rightward due to the lateral force F. However, since the size C of the spacing 60 is set to be smaller than the distance D between the outer end of the outer tube 54 and the outer end of the inner tube 52, the inner end (bent portion 54A) of the outer tube 54 of the left-side bush 50 abuts the projecting portion 56A before the outer end of the outer tube 54 of the right-side bush 50 abuts the outer-side bracket 38. Accordingly, the same effects as those of the first embodiment can be obtained.

Since the inward displacement of the suspension relative to the body in the transverse direction of the vehicle is first restricted by providing the bent portion 54A on the outer tube 54 of the bush 50 and by forming the projecting portion 56A when the rubber member 56 undergoes a vulcanization/forming process.

In the present embodiment, in addition to the above-described stopper function, there can be provided a toe correcting function, which will be described below. That is, the bush 50 of the present embodiment has steer angle correcting means.

Figure 4A:
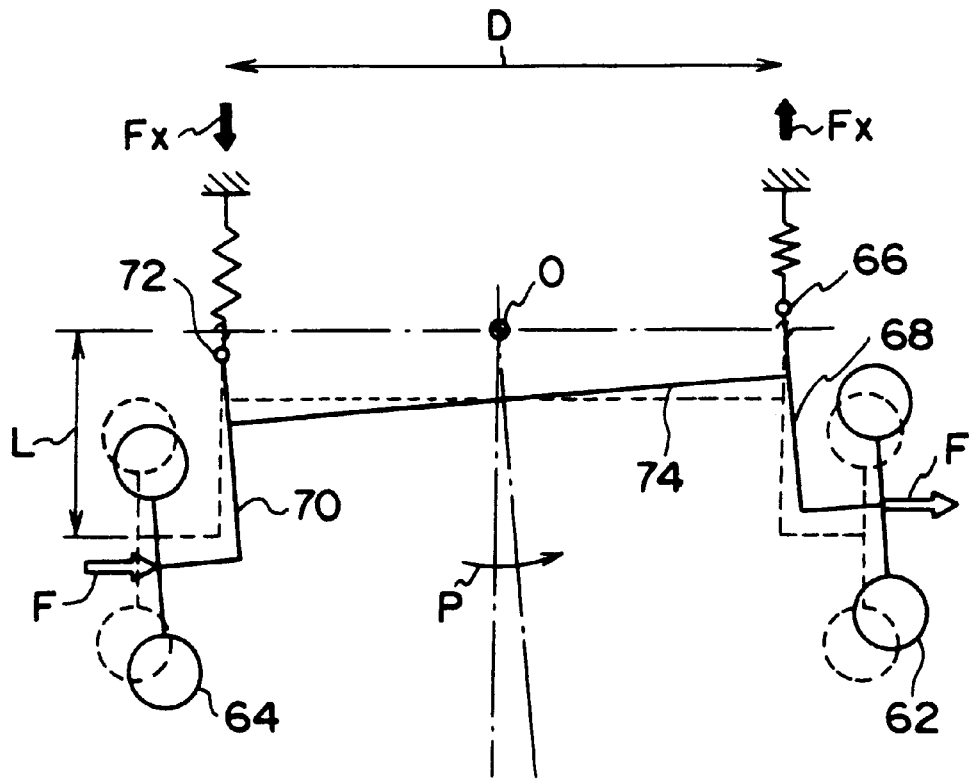
FIG. 4A is a schematic diagram used for explaining the toe-correcting function of the bush shown in FIG. 3.

FIG. 4A shows a schematic view of a twist beam rear suspension which has no toe correcting function. When a rightward lateral force F acts on right and left wheels 62 and 64 due to lateral slip during cornering, a forward longitudinal force $F_X$ ($=2\times F\times L/D$) acts on a right-side bush 66. In the equation for obtaining the forward longitudinal force $F_X$, L is the arm length of the trailing arms 68 and 70 (in FIG. 4A, the distance in the longitudinal direction of the vehicle between the left-side bush 72 and the center of the wheel 64), and D is the distance between the right-side bush 66 and the left-side bush 72. Meanwhile, a backward longitudinal force $F_x(=2\times F\times L/D)$ acts on the left-side bush 72. Due to these forward and backward longitudinal forces $F_X$, the right-side bush 66 moves forwardly, while the left-side bush 72 moves backwardly. Accordingly, the twist beam 74 rotates in the counterclockwise direction about a rotational center O, so that the steer angle varies in the direction of causing over steer (hereinafter referred to as "OS") (in the direction of arrow P).

When the steer angle of the twist beam 74 varies in the OS direction, the driving stability is adversely affected thereby. Therefore, the steer angle must be corrected toward the direction of causing an under steer (hereinafter referred to as "US"). The correction toward the US direction not only means to make the steer angle US but also means to decrease the amount of OS.

Figure 4B:
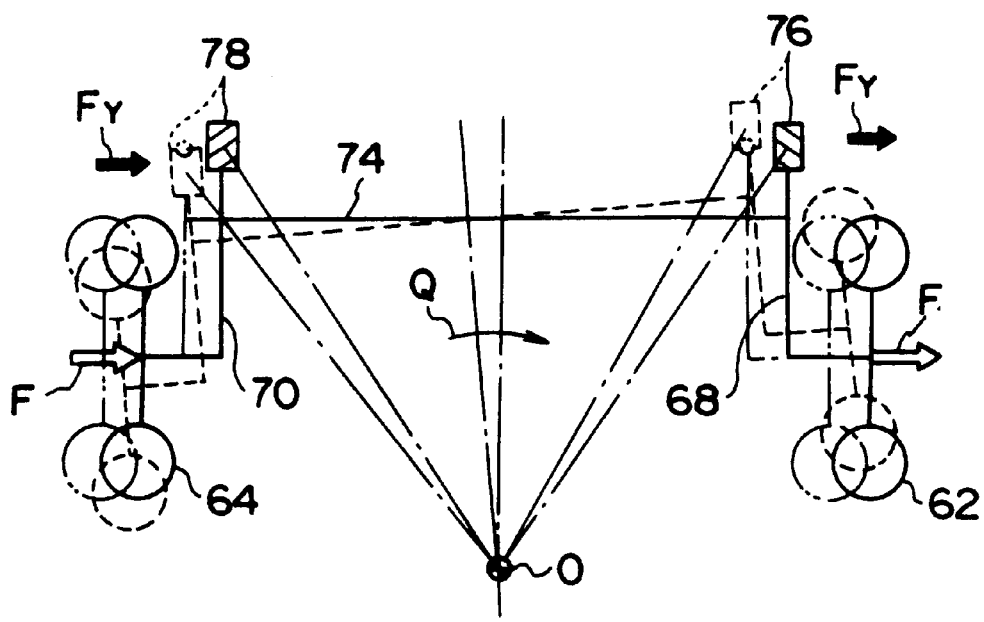
FIG. 4B is a schematic diagram used for explaining the toe-correcting function of the bush shown in FIG. 3.

To achieve the above-described correction, a characteristic is given to the bushes 76 and 78 such that when a rightward lateral force F acts on the right and left wheels 62 and 64, a rightward force $F_Y$ acts on the right-side bush 76 so as to displace the right-side bush 76 in the backward direction as well as in the rightward direction, and a rightward force $F_Y$ acts on the left-side bush 78 so as to displace the left-side bush 78 in the forward direction as well as in the rightward direction, as shown in FIG. 4B. Due to this characteristic, the twist beam 74 rotates in the clockwise direction about a rotational center O, so that the steering angle is corrected toward the US direction (in the direction of arrow Q).

By using the bush 50 of the present embodiment as the bushes 76 and 78, a toe correcting function is obtained. That is, when a rightward lateral force F acts on the bush 50, a rightward lateral force $F_Y$ acts on the outer tube 54, so that the outer tube 54 is displaced in the rightward direction in FIG. 4B. At the same time, the expanded portion 56B sandwiched between the slant portion 54B of the outer tube 54 and the slant portion 58A of the plate 58 is compressed, and a reaction force is generated. Since this reaction force acts on the outer tube 54 as a forward longitudinal force $F_X$, the outer tube 54 is also displaced in the forward direction in FIG. 4B. As a result, the left-side bush 50 is displaced from the position indicated by a broken line to the position indicated by a continuous line in the direction of arrow Q.

The bush 50 disposed on the right side in FIG. 4B is also displaced in the same manner. Accordingly, the bushes 50 according to the present embodiment can provide a toe correcting function.

Moreover, since the bushes 50 of the present embodiment have both the stopper function and the toe correcting function, the bushes 50 consequently have improved durability against input loads in the transverse direction of the vehicle. In general, in order to obtain comfortably riding feel by decreasing vibration (harshness) produced when tires pass over small unevenness on a road surface such as joint portions of the road, it is necessary to decrease the spring constant of each bush in the longitudinal direction of the vehicle so as to allow the wheels to easily move in the longitudinal direction of the vehicle. In this case, however, when a lateral force F to the right and left wheels, a larger variation in the steer angle is caused by the forward and backward longitudinal forces $F_x$, so that the tendency of OS becomes stronger. When this tendency is corrected toward the US direction by employing the above-described bush structure, the lateral displacement and the forward/backward displacement due to the lateral force $F_y$ must be increased. Although this can be realized by decreasing the lateral spring constant of each bush in the transverse direction of the vehicle as well as the spring constant of each bush in the longitudinal direction of the vehicle, this causes a problem that each bush is excessively displaced due to a lateral force acting thereto, thereby deteriorating the durability of the bush. In contrast, in the bush of the present embodiment, since the lateral displacement can be restricted by causing the bent portion 54A of the outer tube 54 to abut the projecting portion 56A of the rubber material 56, the durability of each bush 50 against lateral input loads can be increased by setting the size C of the above-described spacing such that it can prevent excessive displacement of the bush 50.

Figure 5:
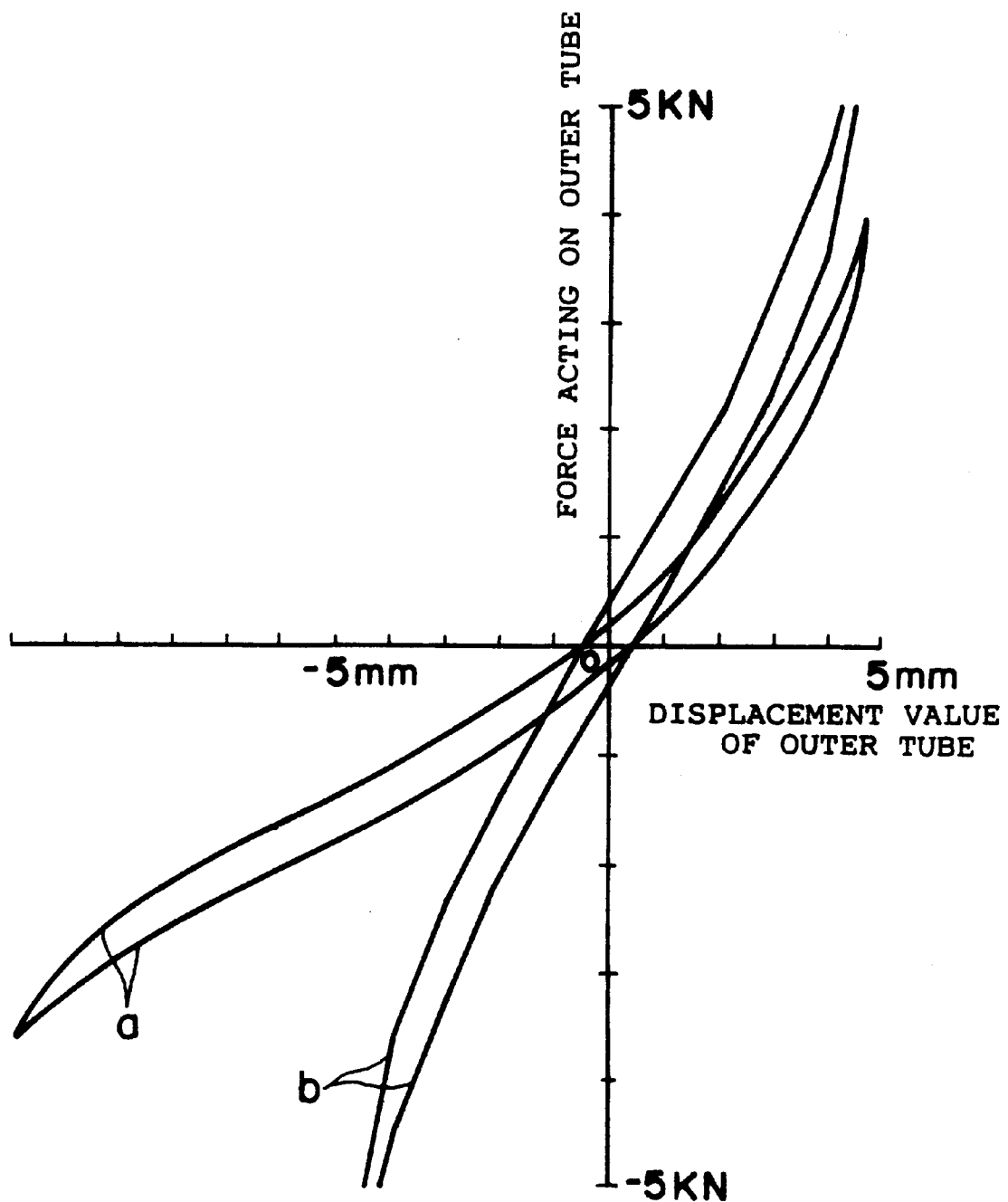
FIG. 5 is a graph used for supplementary explanation of the effect provided by the bush shown in FIG. 3.

FIG. 5 is a graph which shows the spring characteristic of the bush 50 in the transverse direction of the vehicle. In this graph, the horizontal axis represents the amount of the lateral displacement of the outer tube 54 of the bush 50, and when the amount of displacement takes a positive value, it means that the outer tube 54 moves inwardly in the transverse direction of the vehicle (outwardly in the bush 50 disposed on the left side). The vertical axis represents the lateral force acting on the outer tube 54. The characteristic curve a shows the characteristic of the bush 50 itself, while the characteristic curve b shows the characteristic of the bush 50 which is used as the bush of the above-described twist beam suspension. As is apparent from the characteristic curve b, excessive lateral displacement of the bush 50 due to lateral input loads is suppressed, and this is advantageous to the durability of the bush 50.

Figure 6:
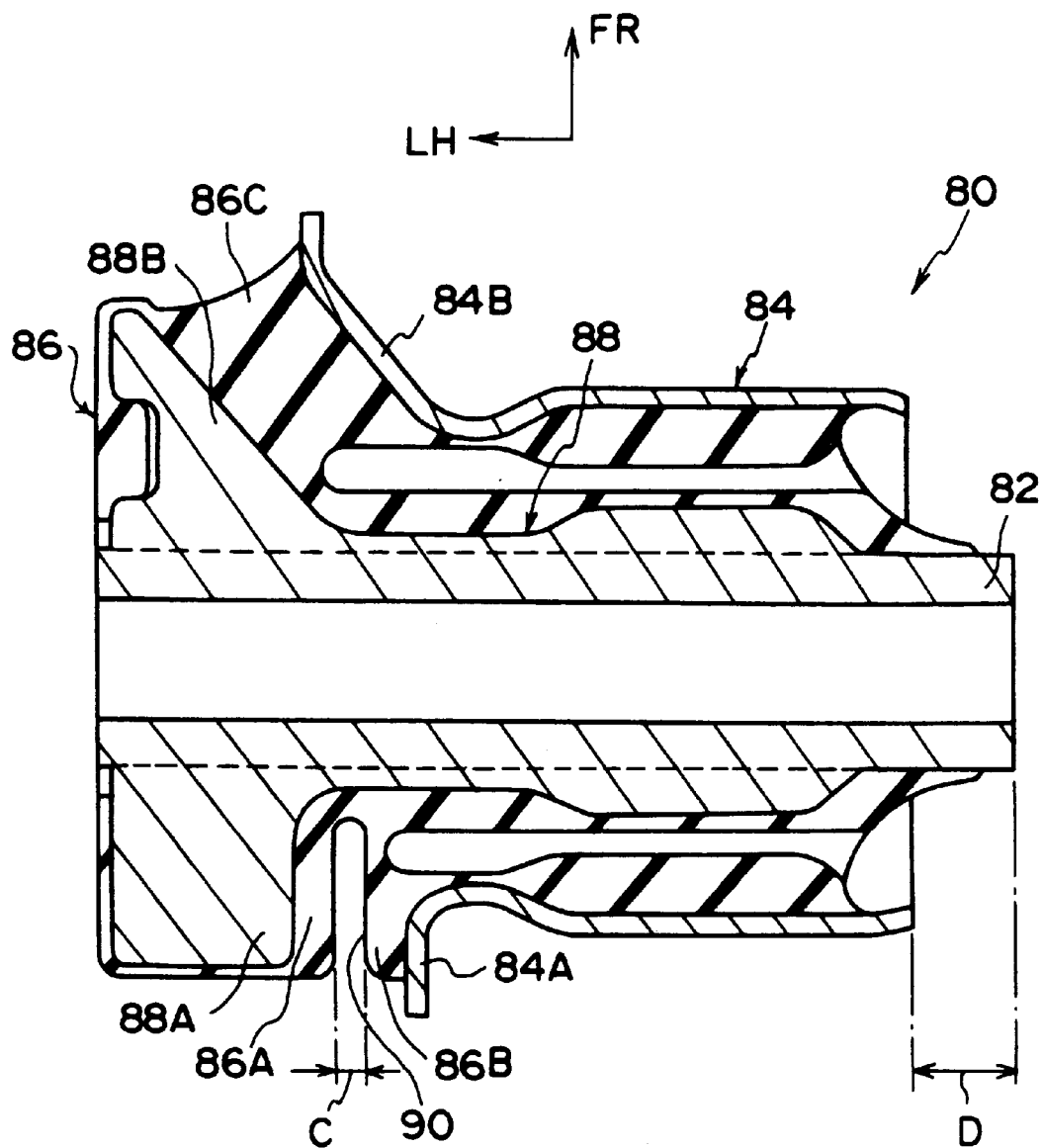
FIG. 6 is a horizontal cross section of a bush which has a structure different from that of the bush shown in FIG. 3 but has a similar function as that of the bush shown in FIG. 3.

FIG. 6 shows a horizontal cross section of a bush 80 serving as a connecting member which has a structure different from that of the above-described bush 50 but has a similar function as that of the bush 50. A brief description will now be given of the bush 80. The bush 80 is disposed on the right side of the above-described twist beam rear suspension. As shown in FIG. 6, the bush 80 is composed of an inner tube 82, an outer tube 84, and a rubber member 86 which is disposed between the sleeves 82 and 84 and joined thereto through vulcanization. At the inner end of the inner tube 82 is provided a flange portion 88. The flange portion 88 has a projecting portion 88A which has a rectangular cross section and which projects from the inner end of the inner tube 82 toward the rear of the vehicle, and a slant portion 88B which has a substantially triangular cross section and which projects from the inner end of the inner tube 82 toward the front of the vehicle. The outer tube 84 has the same shape as that of the outer tube 54 of the above-described bush 50, and it has a bent portion 84A and a slant portion 84B. The rubber member 86 has a portion serving as an elastic member which is joined through vulcanization to the outer end of the projecting portion 88A of the flange portion 88 (hereinafter this portion will be referred to as a "flange-side rubber portion 86A"), and a portion serving as an elastic member which is joined through vulcanization to the inner end of the bent portion 84A of the outer tube 84 (hereinafter this portion will be referred to as a "outer tube-side rubber portion 86B"). Each of these rubber portions has a predetermined thinness, so that a spacing 90 of a size C is formed between the flange-side rubber portion 86A and the outer tube-side rubber portion 86B. Further, the distance between the outer end of the inner tube 82 and the outer end of the outer tube 84 is set to D. Moreover, the space between the slant portion 88B of the flange portion 88 and the slant portion 84B of the outer tube 84 is filled with the rubber material 86. As a result, an expanded portion 86C having the same function as that of the expanded portion 50B of the bush 50 is formed. Accordingly, the bush 80 has substantially the same function as the bush 50 and provides action and effects similar to those provided by the bush 50. Further, means for transferring force, corresponding to restricting means, is applied to the vehicle in the transverse direction of the vehicle when the vehicle is traveling in a curve, to the body of the vehicle through mainly the one of the trailing arms, which is at the outerwheel in the curve, and preventing said force from being applied to the twist beam.

What is claimed is:

1. A twist beam suspension comprising:

a twist beam which is disposed so that a longitudinal direction thereof runs along with the transverse direction of a vehicle;

a pair of trailing arms being connected to a body of the vehicle and each of which is disposed at a respectively different longitudinal end of said twist beam and is disposed such that a longitudinal direction of said pair of trailing arms runs along the longitudinal direction of the vehicle;

an outer tube disposed in each trailing arm;

an inner tube disposed in each outer tube;

an elastic member disposed between each said outer tube and said inner tube; and restricting means for restricting inward displacement of one of said trailing arms relative to the body of the vehicle in the transverse direction of the vehicle prior to restricting outward displacement of the outer of said trailing arms relative to the body of the vehicle in the transverse direction of the vehicle.

2. A twist beam suspension according to claim 1, wherein said restricting means is a bracket, and said bracket is provided on the body of the vehicle.

3. A twist beam suspension according to claim 1, wherein said restricting means is a bracket, and said bracket is provided on the body of the vehicle, and the twist beam suspension further comprises a connecting member for connecting a front end portion of each of said trailing arms in the longitudinal direction of the vehicle to the body of the vehicle, said bracket is disposed on the inner side of said connecting member in the transverse direction of the vehicle.

4. A twist beam suspension according to claim 3, wherein said inner tube is provided at said body of the vehicle and the distance between said bracket and said outer tube is smaller than the distance between an outer-side bracket and said outer tube, said outer-side bracket being disposed on the outer side of said connecting member in the transverse direction of the vehicle.

* * * * *